United States Patent
Horiuchi

(10) Patent No.: US 9,884,521 B2
(45) Date of Patent: Feb. 6, 2018

(54) RUN FLAT TIRE

(71) Applicant: The Yokohama Rubber Co., LTD., Minato-ku, Tokyo (JP)

(72) Inventor: Kenji Horiuchi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 329 days.

(21) Appl. No.: 14/406,111

(22) PCT Filed: Sep. 3, 2013

(86) PCT No.: PCT/JP2013/073616
§ 371 (c)(1),
(2) Date: Dec. 5, 2014

(87) PCT Pub. No.: WO2014/042035
PCT Pub. Date: Mar. 20, 2014

(65) Prior Publication Data
US 2015/0202929 A1    Jul. 23, 2015

(30) Foreign Application Priority Data

Sep. 14, 2012  (JP) .................................. 2012-202342

(51) Int. Cl.
*B60C 17/00* (2006.01)
*B60C 9/20* (2006.01)
(Continued)

(52) U.S. Cl.
CPC ............ *B60C 17/0009* (2013.01); *B60C 9/20* (2013.01); *B60C 13/00* (2013.01);
(Continued)

(58) Field of Classification Search
CPC ...... B60C 17/00; B60C 17/0009; B60C 15/00
See application file for complete search history.

(56) References Cited

U.S. PATENT DOCUMENTS 4,365,659 A  *  12/1982  Yoshida ................ B60C 1/0008
152/510
4,779,658 A     10/1988  Kawabata et al.
(Continued)

FOREIGN PATENT DOCUMENTS

JP    S62-279107    12/1987
JP    H07-304312    11/1995
(Continued)

OTHER PUBLICATIONS

International Search Report for International Application No. PCT/JP2013/073616 dated Dec. 10, 2103, 4 pages, Japan.

*Primary Examiner* — Justin R Fischer
(74) *Attorney, Agent, or Firm* — Thorpe North & Western

(57) ABSTRACT

In a side reinforcing type run flat tire, a minimum wall thickness portion is arranged between an end portion of each belt layer and a position at 70% of a tire cross-sectional height SH. A relationship between a thickness $G_{min}$ of the minimum wall thickness portion and a thickness $G_{max}$ of a maximum wall thickness portion 17 is $0.5 \times G_{max} \leq G_{min} \leq 0.8 \times G_{max}$. A relationship between a length L min of a thin wall region and the tire cross-sectional height SH is $0.18 \times SH \leq L_{min} \leq 0.26 \times SH$. A relationship among a weight Wr of a side reinforcing layer, a total weight Wt of the tire, and a tire flattening rate R is $0.08 \times Wt \times (1-0.2 \times (1-R/50)) \leq Wr \leq 0.18 \times Wt \times (1-0.2 \times (1-R/50))$. A relationship between a thickness Ga at a rim check line position of an outer side rubber portion more to the outer side than a carcass layer and a maximum thickness Gb thereof is $0.8 \times Gb \leq Ga \leq 1.0 \times Gb$.

15 Claims, 4 Drawing Sheets

(51) Int. Cl.
  *B60C 13/00* (2006.01)
  *B60C 15/06* (2006.01)
  *B60C 15/00* (2006.01)
  *B60C 1/00* (2006.01)

(52) U.S. Cl.
  CPC .......... *B60C 15/0036* (2013.01); *B60C 15/06* (2013.01); *B60C 15/0603* (2013.01); *B60C 2001/0033* (2013.01); *B60C 2013/006* (2013.01); *B60C 2015/0614* (2013.01); *B60C 2015/0621* (2013.01); *B60C 2017/0063* (2013.01)

(56) References Cited

U.S. PATENT DOCUMENTS

| | | |
|---|---|---|
| 2011/0284143 A1 | 11/2011 | Horiuchi |
| 2012/0073718 A1 | 3/2012 | Horiuchi |
| 2012/0132338 A1 | 5/2012 | Horiuchi |
| 2013/0397193 | 2/2013 | Horiuchi |

FOREIGN PATENT DOCUMENTS

| | | |
|---|---|---|
| JP | 2009-061866 | 3/2009 |
| JP | 2011-240895 | 12/2011 |
| JP | 2012-071709 | 4/2012 |
| JP | 2012-116212 | 6/2012 |
| JP | 2012-162230 | 8/2012 |

* cited by examiner

RUN FLAT TIRE

TECHNICAL FIELD

The present technology relates to a side reinforcing type run flat tire, and more specifically relates to a run flat tire that can achieve to a high degree both durability during run flat traveling and ride comfort during regular traveling and that can suppress weight increase to a minimum.

BACKGROUND

Conventionally, a side reinforcing type run flat tire has been proposed (see, for example, Japanese Unexamined Patent Application Publication Nos. H07-304312A and 2009-61866A) as a run flat tire that can travel while flat that has a side reinforcing layer with a falcated cross-section arranged on the inner side of the side wall portion.

With this type of side reinforcing type run flat tire, it is common that the thickness of the side reinforcing layer is greater and a rubber composition having a high hardness is used in the side reinforcing layer in order to increase the durability during run flat traveling.

However, when increasing the thickness of the side reinforcing layer and increasing the hardness of the rubber composition that composes the side reinforcing layer, there is a problem in that the ride comfort degrades during regular traveling in conjunction with the increase in stiffness of the side wall portion, or there is a pronounced increase in the weight of the tire. Therefore, a way is sought to enhance durability during run flat traveling without degrading ride comfort and without increasing the tire weight.

SUMMARY

The present technology provides a run flat tire that can achieve to a high degree both durability during run flat traveling and ride comfort during regular traveling and that can suppress weight increase to a minimum.

A run flat tire of the present technology includes: an annular tread portion extending in a tire circumferential direction; a pair of side wall portions arranged on both sides of the tread portion; and a pair of bead portions arranged on inner sides in a tire radial direction of the side wall portions; and at least one carcass layer being mounted between the pair of bead portions, the carcass layer being wound from a tire inner side to a tire outer side around a bead core of each of the bead portions, a bead filler being arranged on an outer peripheral side of each bead core in each of the bead portions, a plurality of belt layers being arranged on an outer peripheral side of the carcass layer in the tread portion, a side reinforcing layer in a falcated cross-sectional shape being arranged between the carcass layer and an inner liner layer in the side wall portion; wherein a minimum wall thickness portion in a range from a center position of the tread portion to a tire maximum width position is arranged between an end portion of the belt layers and a position at 70% of a tire cross-sectional height SH, a relationship between a thickness $G_{min}$ of the minimum wall thickness portion and a thickness $G_{max}$ of the maximum wall thickness portion in the side wall portion is $0.5 \times G_{min} \leq G_{min} \leq 0.8 \times G_{max}$, and a relationship between a length $L_{min}$ on a tire outer surface in a tire meridian cross-section of a thin wall region where a wall thickness difference to the minimum wall thickness portion is 1 mm or less and the tire cross-sectional height SH is $0.18 \times SH \leq L_{min} \leq 0.26 \times SH$;

a relationship among a weight Wr of the side reinforcing layer, a total weight Wt of the tire, and a tire flattening rate R (%) is $0.08 \times Wt \times (1-0.2 \times (1-R/50)) \leq Wr \leq 0.18 \times Wt \times (1-0.2 \times (1-R/50))$;

a relationship between a thickness Ga on a rim check line position of an outer side rubber portion positioned more to the outer side than the carcass layer and a maximum thickness Gb in the side wall portion of the outer side rubber portion is $0.8 \times Gb \leq Ga \leq 1.0 \times Gb$; and a relationship between a thickness Gc on a rim check line position of an inner side rubber portion positioned more to the inner side than the carcass layer and the thickness Ga on the rim check line position of the outer side rubber portion is $0.7 \times Ga \leq Gc \leq 1.0 \times Ga$.

As a result of diligent research on root causes of failure in run flat tires, the present inventors arrived at the present technology by discovering that tire failure during run flat traveling is mainly due to rupture of the carcass cords generated in an area on which the rim flange abuts, and that providing appropriate deflection characteristics in the tire while avoiding this type of rupture in the carcass cords is a most effective method for improving durability, ride comfort, and lightness of weight.

That is, in the present technology, arranging a minimum wall thickness portion in a range from a center position of the tread portion to the tire maximum width position between an end portion of the belt layers and a position at 70% of the tire cross-sectional height SH and providing a thin wall region associated therewith can improve the ride comfort during regular traveling, and suppress buckling of the tread portion during run flat traveling, and furthermore, proactively deflecting a buttress portion during run flat traveling can reduce strain on the rim cushion portion on which the rim flange abuts. An effect of simultaneously improving the ride comfort during regular traveling and the durability during run flat traveling can be thereby achieved.

Further, setting an appropriate weight Wr of the side reinforcing layer to the total weight Wt of the tire with consideration of the tire flattening rate R can reduce the weight Wr of the side reinforcing layer without sacrificing the ride comfort during regular traveling and the durability during run flat traveling.

Furthermore, setting a thickness Ga in a rim check line position of an outer side rubber portion positioned more to the outer side than the carcass layer to be sufficiently great relative to a maximum thickness Gb in the side wall portion of the outer side rubber portion thereof can avoid local stress concentration on the carcass cords configuring the carcass layer, and prevent rupture of the carcass cords in the rim cushion portion. The durability during run flat traveling can be thereby improved. Further, because increasing the thickness Ga in the rim check line position of the outer side rubber portion reduces shock and vibration transferred from the tire through the rim, an effect of enhancing ride comfort during regular traveling can also be obtained.

Further, setting a thickness Gc in a rim check line position of an inner side rubber portion positioned more to the inner side than the carcass layer to be sufficiently great relative to the thickness Ga in the rim check line position of the outer side rubber portion can suppress shear stress at work in the carcass layer, and improve the durability during run flat traveling.

In the present technology, it is preferred that a tan δ of a rubber composition composing the side reinforcing layer is from 0.01 to 0.08 at 60° C. and that a JIS-A hardness of a rubber composition composing the side reinforcing layer is from 68 to 80 at 20° C. Further, it is preferred that a tan δ of a rubber composition composing the bead filler is from 0.03 to 0.08 at 60° C. and that a JIS-A hardness of a rubber composition composing the bead filler is from 68 to 74 at 20° C. Furthermore, it is preferred that an additional reinforcing layer is embedded more to the outer side than the carcass layer within a range of 15% to 70% of the tire cross sectional height SH, that a width of the additional reinforcing layer is at least 35% of the tire cross sectional height SH, and that a maximum thickness Gd of the additional reinforcing layer is from 2 mm to 7 mm. It is preferred that a tan δ of a rubber composition composing the additional reinforcing layer is from 0.01 to 0.08 at 60° C. and that a JIS-A hardness of a rubber composition composing the additional reinforcing layer is from 68 to 80 at 20° C. Making the tan δ and the JIS-A hardness of these tire configuration members appropriate can achieve both the durability during run flat traveling and the ride comfort during regular traveling to a high degree.

It is preferred that the side reinforcing layer is configured of an inner peripheral section and an outer peripheral section that overlap in the tire radial direction and that a JIS-A hardness of a rubber composition composing the outer peripheral section at 20° C. is less than a JIS-A hardness of a rubber composition composing the inner peripheral section at 20° C. Similarly, it is preferred that the bead filler is configured of an inner peripheral section and an outer peripheral section that overlap in the tire radial direction and that a JIS-A hardness of a rubber composition composing the outer peripheral section at 20° C. is less than a JIS-A hardness of a rubber composition composing the inner peripheral section at 20° C. Furthermore, it is preferred that the additional reinforcing layer is configured of an inner peripheral section and an outer peripheral section that overlap in the tire radial direction, and a JIS-A hardness of a rubber composition composing the outer peripheral section at 20° C. is less than a JIS-A hardness of a rubber composition composing the inner peripheral section at 20° C. The ride comfort during regular traveling can be thereby further enhanced.

It is preferred that a belt cover layer is arranged on an outer peripheral side of the belt layers and that the belt cover layer is configured of composite fiber cords in which a low elasticity yarn and a high elasticity yarn having a mutually different elastic modulus are twisted together. Buckling of the tread portion during run flat traveling can be thereby prevented and the durability can be thereby enhanced. Further, adding this type of belt cover layer increases the rigidity of the tread portion, thereby making it possible to also improve steering stability and ride comfort during regular traveling.

In the present technology, the tire cross-sectional height SH is a height measured by a measurement method for tire dimensions determined by a standard according to the tire. Various dimensions which do not include the tire cross-sectional height SH are dimensions measured from a cut sample taken along the tire meridian.

Further, in the present technology, tan δ is measured using a viscoelastic spectrometer (manufactured by Toyo Seiki Seisaku-sho, Ltd.) under the conditions of 20 Hz frequency, 10% initial distortion, +/−2% dynamic distortion, and a temperature of 60° C. in accordance with JIS-K6394. JIS-A hardness is the durometer hardness measured in accordance with JIS K-6253 using a type A durometer and under a temperature of 20° C.

DETAILED DESCRIPTION

The following is a detailed description of the configuration of the present technology with reference to the accompanying drawings. FIG. 1 to FIG. 4 illustrate a run flat tire according to an embodiment of the present technology.

Figure 1:
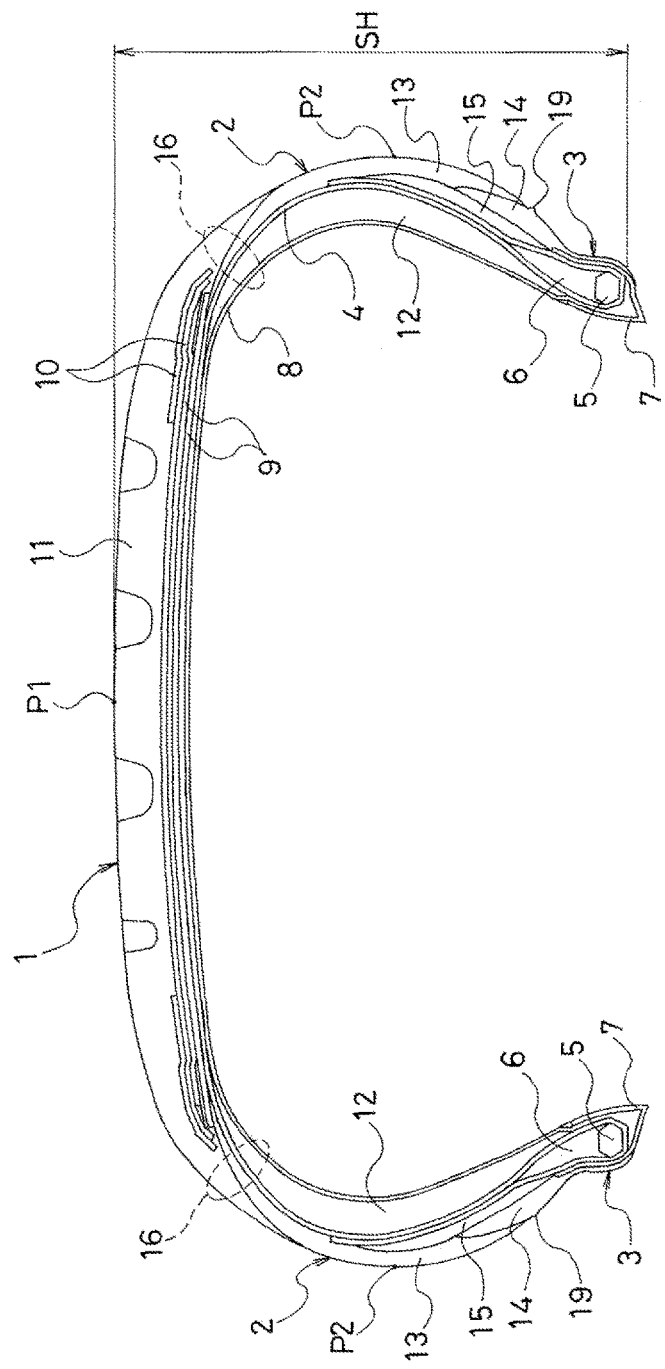
FIG. 1 is a meridian cross-sectional view illustrating a run flat tire according to an embodiment of the present technology.

As illustrated in FIG. 1, a run flat tire of this embodiment is provided with a tread portion 1 extending in the tire circumferential direction to form an annular shape, a pair of side wall portions 2 that are disposed on both sides of the tread portion 1, and a pair of bead portions 3 that are disposed on the inner side in the tire radial direction of the side wall portions 2.

At least one carcass layer 4 is mounted between a pair of bead portions 3. The carcass layer 4 includes a plurality of carcass cords oriented in the tire radial direction. The carcass layer 4 is folded back around a bead core 5 disposed in each of the bead portions 3 from the tire inner side to the tire outer side. Organic fiber cords are preferably used as the carcass cords of the carcass layer 4. A bead filler 6 having a triangular cross-sectional shape is disposed on an outer peripheral side of each of the bead cores 5. Moreover, a chafer 7 is disposed on each bead portion 3 so as to encase the bead core 5. Further, an inner liner layer 8 is disposed in a region between the pair of bead portions 3 on a tire inner surface.

On the other hand, a plurality of belt layers 9 is embedded on an outer circumferential side of the carcass layer 4 in the tread portion 1. These belt layers 9 include a plurality of reinforcing cords that incline with respect to the tire circumferential direction and the reinforcing cords are disposed between the layers so as to intersect each other. In the belt layers 9, an inclination angle of the reinforcing cords with respect to the tire circumferential direction is set in a range of, for example, 10° to 40°. Steel cords are preferably used as the reinforcing cords of the belt layers 9. For the purpose of enhancing high-speed durability, at least one belt cover layer 10 formed by arranging reinforcing cords at an angle of not more than 5° with respect to the tire circumferential direction, is disposed on an outer circumferential side of the belt layers 9. The belt cover layer 10 preferably has a jointless structure in which a strip material having at least one reinforcing cord laid in parallel and covered with rubber is wound continuously in the tire circumferential direction. Also, the belt cover layer 10 can be disposed so as to cover the belt layer 9 in the width direction at all positions, or can be disposed to cover only the edge portions of the belt layer 7 to the outside in the width direction. Nylon, aramid, or similar organic fiber cords are preferably used as the reinforcing cords of the belt cover layer 10.

Further, a tread rubber layer 11 is disposed on an outer side of the belt layer 9 and the belt cover layer 10 in the tread portion 1. A side reinforcing layer 12 having a falcated cross-sectional shape to enable run flat traveling is disposed between the carcass layer 4 and an inner liner layer 8 in the side wall portion 2. A side wall rubber layer 13 is disposed on an outer side of the carcass layer 4 in the side wall portion 2. A rim cushion rubber layer 14 is disposed on an outer side of the carcass layer 4 in the bead portion 3. Further, an additional reinforcing layer 15 is inserted between the carcass layer 4, and the side wall rubber layer 13 and the rim cushion rubber layer 14.

Figure 2:
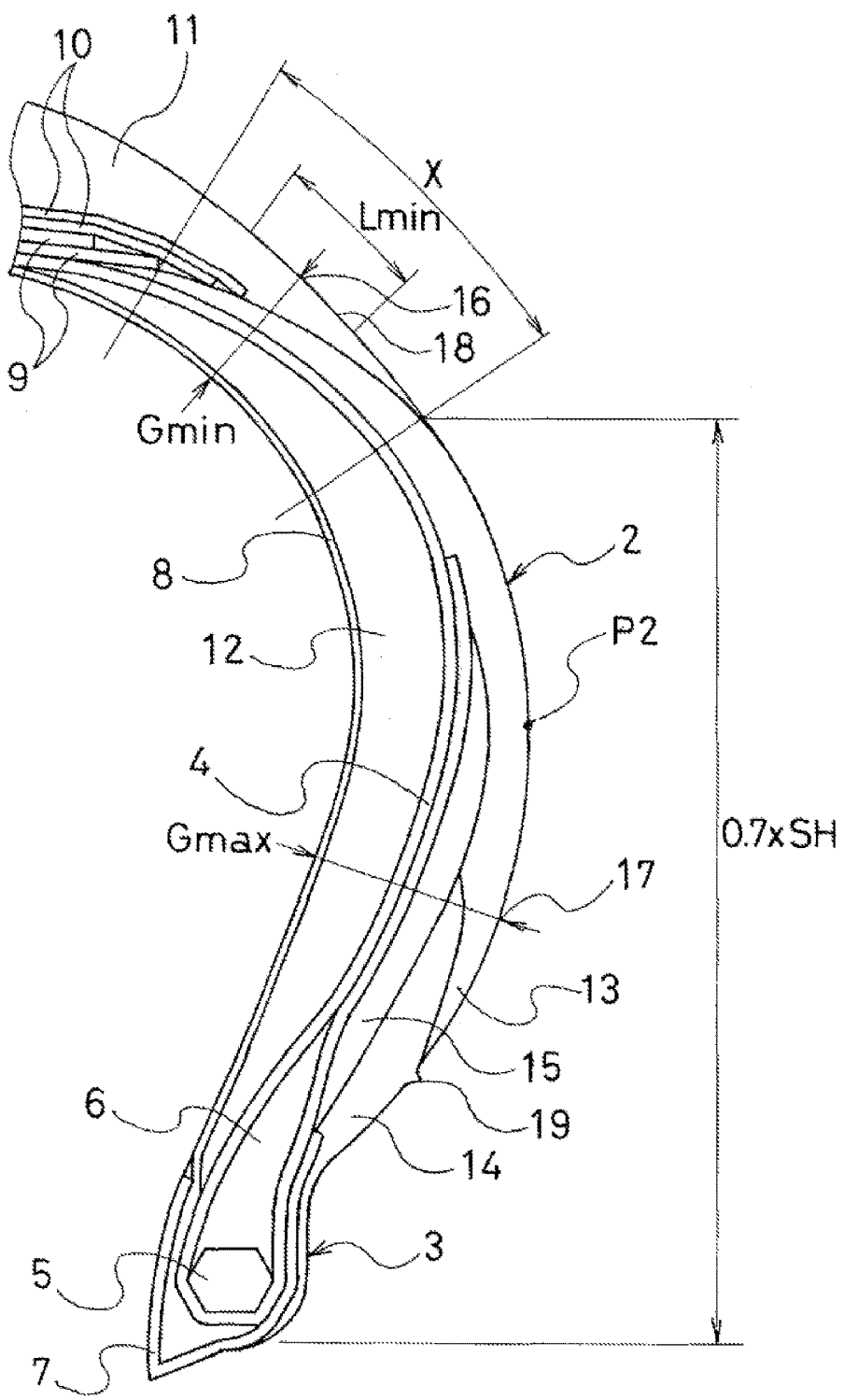
FIG. 2 is a cross-sectional view illustrating main parts of the run flat tire of FIG. 1.

In the above run flat tire, as illustrated in FIG. 1 and in FIG. 2, a minimum wall thickness portion 16 where the tire wall thickness is a minimum value in a range from a center position P1 of the tread portion 1 to a tire maximum width position P2 is disposed in a region X defined between an end portion of the belt layers 9 and a position at 70% of a tire cross-sectional height SH. A relationship between a thickness $G_{min}$ of the minimum wall thickness portion 16 and a thickness $G_{max}$ of a maximum wall thickness portion 17 where the tire wall thickness is a maximum value in the side wall portion 2 is $0.5 \times G_{max} \leq G_{min} \leq 0.8 \times G_{max}$. The thickness $G_{min}$ of the minimum wall thickness portion 16 and the thickness $G_{max}$ of the maximum wall thickness portion 17 are thicknesses measured along a normal line of the tire inner surface, respectively, and are thicknesses from the tire inner surface to a tire outer surface. Furthermore, a relationship between a length $L_{min}$ on the tire outer surface in the tire meridian cross-section of a thin wall region 18 where the wall thickness difference with the minimum wall thickness portion 16 is 1 mm or less and the tire cross-sectional height SH is $0.18 \times SH \leq L_{min} \leq 0.26 \times SH$.

Arranging the minimum wall thickness portion 16 in a range from the center position P1 of the tread portion 1 to the tire maximum width position P2 in this manner between the end portion of the belt layers 9 and the position at 70% of the tire cross-sectional height SH and forming the thin wall region 18 associated therewith improves the ride comfort during regular traveling and suppresses buckling of the tread portion 1 during run flat traveling, and furthermore, proactively deflecting a buttress portion that includes the minimum wall thickness portion 16 during run flat traveling can reduce strain of the rim cushion portion on which a rim flange abuts. An effect of simultaneously improving the ride comfort during regular traveling and the durability during run flat traveling can be thereby achieved.

Here, when the thickness $G_{min}$ of the minimum wall thickness portion 16 is less than $0.5 \times G_{max}$, the durability during run flat traveling is reduced, and conversely, when the thickness $G_{min}$ is greater than $0.8 \times G_{max}$, the ride comfort during regular traveling is reduced. Further, when the length $L_{min}$ of the thin wall region 18 where the wall thickness difference with the minimum wall thickness portion 16 is 1 mm or less is less than $0.18 \times SH$, the ride comfort during regular traveling is reduced, and conversely, when the length $L_{min}$ is greater than $0.26 \times SH$, the durability during run flat traveling is reduced.

In the run flat tire described above, a relationship among a weight Wr of the side reinforcing layer 12, a total weight Wt of the tire, and a tire flattening rate R (%) is $0.08 \times Wt \times (1-0.2 \times (1-R/50)) \leq Wr \leq 0.18 \times Wt \times (1-0.2 \times (1-R/50))$. The weight Wr of the side reinforcing layer 12 can be calculated from the product of the volume and specific gravity of the side reinforcing layer 12.

Setting the appropriate weight Wr of the side reinforcing layer 12 to the total weight Wt of the tire with consideration of the tire flattening rate R in this manner can reduce the weight Wr of the side reinforcing layer 12 without sacrificing the ride comfort during regular traveling and the durability during run flat traveling, and suppress the weight increase of the run flat tire to a minimum.

Here, when the weight Wr of the side reinforcing layer 12 is too great, it brings about a weight increase that reduces the ride comfort during regular traveling, and conversely, when the weight Wr is too low, the durability during run flat traveling is reduced. The tire flattening rate R is taken into consideration because a flat tire with a relatively low tire flattening rate R has a relatively high side rigidity, and therefore, the durability during run flat traveling can be secured with little reinforcement. For example, when the flattening rate R is 40%, then $0.08 \times Wt \times 0.96 \leq Wr \leq 0.18 \times Wt \times 0.96$, and when the flattening rate R is 60%, then $0.08 \times Wt \times 1.04 \leq Wr \leq 0.18 \times Wt \times 1.04$.

In the run flat tire described above, as illustrated in FIG. 3, an annular rim check line 19 that extends along the tire circumferential direction is formed in the vicinity of a boundary between the side wall portion 2 and the bead portion 3. This rim check line 19 is a line for confirming the fit of the rim, and is normally formed as a ridge that protrudes from the tire outer surface. A relationship between a thickness Ga on a rim check line position of an outer side rubber portion (side wall rubber layer 13, rim cushion rubber layer 14, and additional reinforcing layer 15) positioned farther to the outer side than the carcass layer 4 and a maximum thickness Gb in the side wall portion 2 of the outer side rubber portion is $0.8 \times Gb \leq Ga \leq 1.0 \times Gb$. Further, a relationship between a thickness Gc on a rim check line position of an inner side rubber portion (inner liner layer 8 and side reinforcing layer 12) positioned more to the inner side than the carcass layer 4 and the thickness Ga on the rim check line position of the outer side rubber portion is $0.7 \times Ga \leq Gc \leq 1.0 \times Ga$. The thickness Ga of the outer side rubber portion and the thickness Gc of the inner side rubber portion are thicknesses measured along a normal line of the tire outer surface (a virtual plane excluding the rim check line 19) on the rim check line position, respectively, and are thicknesses from the carcass surface to the tire outer surface or the tire inner surface. Further, the maximum thickness Gb of the outer side rubber portion is a thickness measured along a normal line of the carcass layer 4 and is a thickness from the carcass surface to the tire outer surface.

Setting the thickness Ga on the rim check line position of the outer side rubber portion positioned more to the outer side than the carcass layer 4 in this manner to be sufficiently great relative to the maximum thickness Gb in the side wall portion 2 of the outer side rubber portion thereof can avoid local stress concentration on the carcass cords configuring the carcass layer 4, and prevent rupture of the carcass cords in the rim cushion portion. The durability during run flat traveling can be thereby improved. In addition, because increasing the thickness Ga on the rim check line position of the outer side rubber portion reduces shock and vibration transferred from the tire through the rim, an effect of enhancing the ride comfort during regular traveling can also be obtained.

Here, when the thickness Ga on the rim check line position of the outer side rubber portion positioned more to the outer side than the carcass layer 4 is less than $0.8 \times Gb$, the durability during run flat traveling and the ride comfort during regular traveling are reduced, and conversely, when the thickness Ga is greater than $1.0 \times Gb$, the carcass line becomes forced causing the rubber volume in that location to be greater than necessary, thereby reducing the durability.

Further, setting the thickness Gc on the rim check line position of the inner side rubber portion positioned more to the inner side than the carcass layer 4 to be sufficiently great relative to the thickness Ga on the rim check line position of the outer side rubber portion can suppress shear stress at work in the carcass layer 4, and improve the durability during run flat traveling.

Here, when the thickness Gc on the rim check line position of the inner side rubber portion positioned more to the inner side than the carcass layer 4 is less than 0.7×Ga, the durability during run flat traveling is reduced, and conversely, when the thickness Gc is greater than 1.0×Ga, the carcass line becomes forced causing the rubber volume in that location to be greater than necessary, thereby reducing the durability.

In the run flat tire described above, it is preferred that a tan δ of a rubber composition composing the side reinforcing layer 12 is from 0.01 to 0.08 at 60° C. and that a JIS-A hardness of the rubber composition composing the side reinforcing layer 12 is from 68 to 80 at 20° C. When the tan δ of the rubber composition of the side reinforcing layer 12 is too low, there is a disadvantage from a producibility and cost perspective, and conversely, when the tan δ is too great, the durability during run flat traveling is reduced. When the rubber composition of the side reinforcing layer 12 is too soft, the durability during run flat traveling is reduced, and conversely, when the rubber composition is too hard, the ride comfort during regular traveling is degraded.

Further, it is preferred that a tan δ of a rubber composition composing the bead filler 6 is from 0.03 to 0.08 at 60° C. and that a JIS-A hardness of the rubber composition composing the bead filler 6 is from 68 to 74 at 20° C. When the tan δ of the rubber composition of the bead filler 6 is too low, there is a disadvantage from a producibility and cost perspective, and conversely, when the tan δ is too great, the durability during run flat traveling is reduced. When the rubber composition of the bead filler 6 is too soft, the durability during run flat traveling is reduced, and conversely, when the rubber composition is too hard, the ride comfort during regular traveling is degraded.

Figure 3:
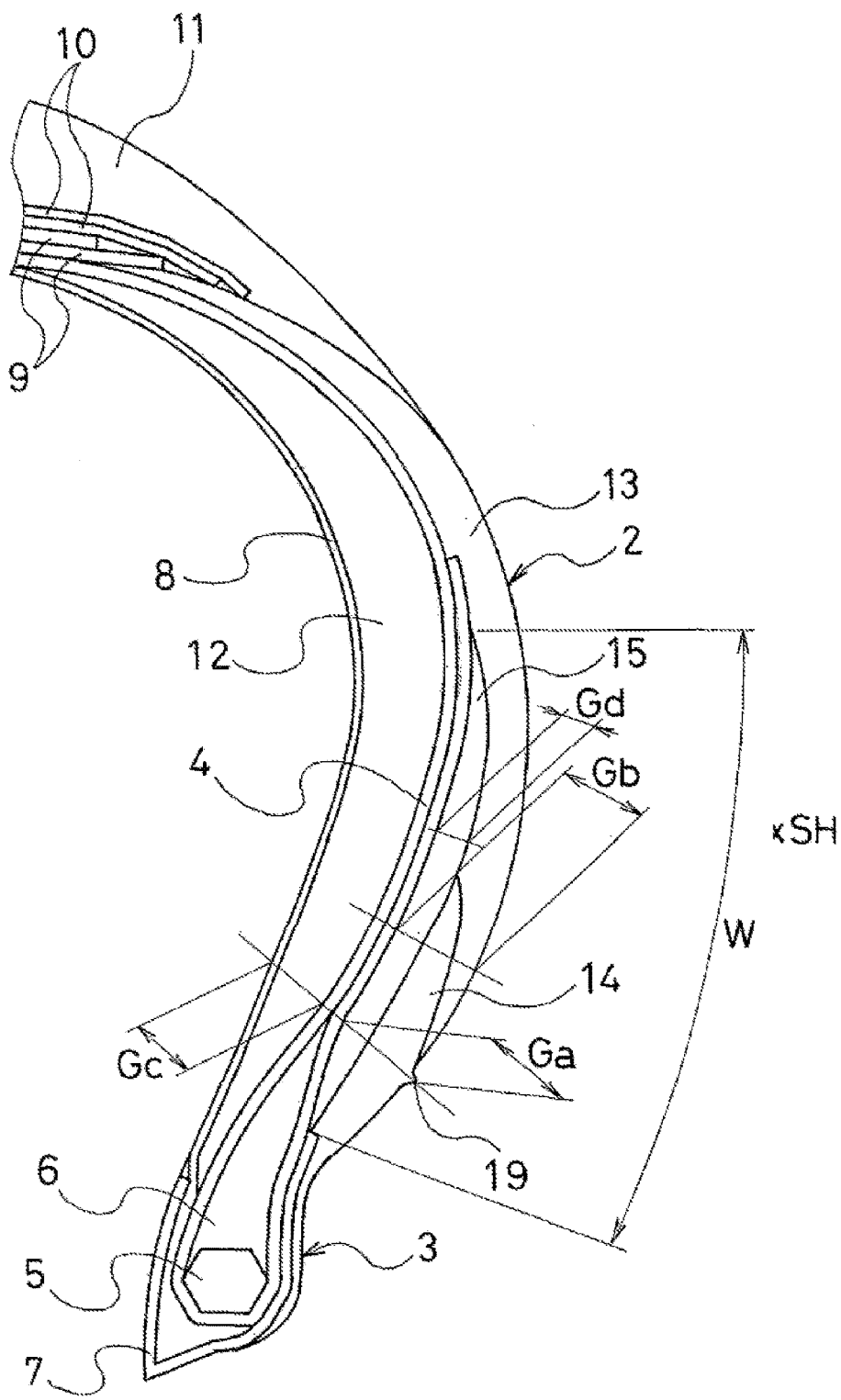
FIG. 3 is another cross-sectional view illustrating main parts of the run flat tire of FIG. 1.

Moreover, when providing the additional reinforcing layer 15, as illustrated in FIG. 3, it is preferred that the additional reinforcing layer 15 is arranged more to the outer side than the carcass layer 4 in a range of 15% to 70% of the tire cross-sectional height SH, that a width W of the additional reinforcing layer 15 is at least 35% of the tire cross-sectional height SH, and that a maximum thickness Gd of the additional reinforcing layer 15 is from 2 mm to 7 mm. The width W of the additional reinforcing layer 15 is a width measured along the carcass layer 4, and the maximum thickness Gd of the additional reinforcing layer 15 is a thickness measured along a normal line of the carcass layer 4.

The additional reinforcing layer 15 may not always be necessary, but embedding the additional reinforcing layer 15 as described above can further improve the durability during run flat traveling. If the additional reinforcing layer 15 is disposed in a wider range, although beneficial from a durability perspective, there is a disadvantage from a producibility and cost perspective. Disposing the additional reinforcing layer 15 within the above range relative to the tire cross-sectional height SH allows more effective reinforcing. When the width W of the additional reinforcing layer 15 is less than 0.35×SH, the durability during run flat traveling is reduced. Further, when the maximum thickness Gd of the additional reinforcing layer 15 is less than 2 mm, the durability during run flat traveling is reduced, and conversely, when the maximum thickness Gd is greater than 7 mm, it brings about an increase in weight, thereby degrading the ride comfort.

It is preferred that a tan δ of a rubber composition composing the additional reinforcing layer 15 is from 0.01 to 0.08 at 60° C. and that a JIS-A hardness of the rubber composition composing the additional reinforcing layer 15 is from 68 to 80 at 20° C. When the tan δ of the rubber composition of the additional reinforcing layer 15 is too low, there is a disadvantage from a producibility and cost perspective, and conversely, when the tan δ is too great, durability during run flat traveling is reduced. When the rubber composition of the additional reinforcing layer 15 is too soft, the durability during run flat traveling is reduced, and conversely, when the rubber composition is too hard, the ride comfort during regular traveling is degraded.

Figure 4:
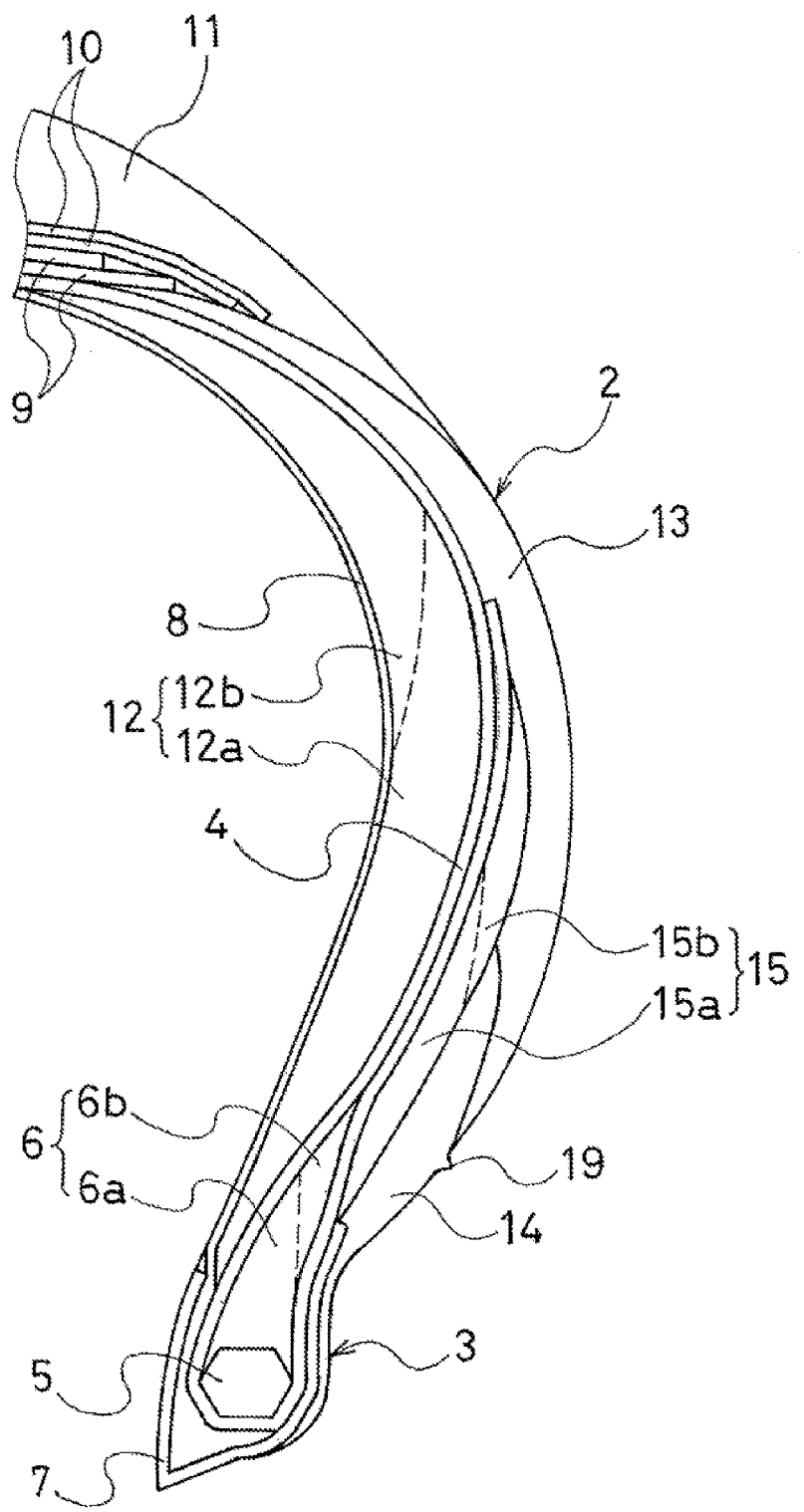
FIG. 4 is yet another cross-sectional view further illustrating main parts of the run flat tire of FIG. 1.

As illustrated in FIG. 4, it is preferred that the side reinforcing layer 12 is configured of an inner peripheral section 12a and an outer peripheral section 12b that overlap in the tire radial direction, and that a JIS-A hardness of a rubber composition composing the outer peripheral section 12b at 20° C. is less than a JIS-A hardness of a rubber composition composing the inner peripheral section 12a at 20° C.

Similarly, it is preferred that the bead filler 6 is configured of an inner peripheral section 6a and an outer peripheral section 6b that overlap in the tire radial direction, and that a JIS-A hardness of a rubber composition composing the outer peripheral section 6b at 20° C. is less than a JIS-A hardness of a rubber composition composing the inner peripheral section 6a at 20° C.

Further, it is preferred that the additional reinforcing layer 15 is configured of an inner peripheral section 15a and an outer peripheral section 15b that overlap in the tire radial direction and that a JIS-A hardness of a rubber composition composing the outer peripheral section 15b at 20° C. is less than a JIS-A hardness of a rubber composition composing the inner peripheral section 15a at 20° C.

As described above, the side reinforcing layer 12, the bead filler 6, and the additional reinforcing layer 15 are configured, as necessary, of rubber compositions of various types having different physical properties, and making the portion on the far side from the bead portion 3 to be relatively softer can further enhance the ride comfort during regular traveling.

As illustrated in FIG. 1, while the belt cover layer 10 is disposed on the outer peripheral side of the belt layer 9, it is preferred that composite fiber cords in which low elasticity yarn and high elasticity yarn having a mutually different elastic modulus are twisted together are used as the reinforcing cord of the belt cover layer 10. Configuring the belt cover layer 10 with composite fiber cords where a low elasticity yarn and a high elasticity yarn having a mutually different elastic modulus are twisted together in this manner allow the weakness of the low elasticity fiber cord where recovery of strain is difficult in conjunction with generated heat at high temperature and the weakness of the high elasticity fiber cord that is inferior in compression fatigue resistance and adhesive strength to complement each other. As a result, buckling of the tread portion 1 during run flat traveling is prevented, thereby enhancing durability. Further, adding this type of belt cover layer 10 increases the rigidity of the tread portion 1, thereby also improving steering stability and ride comfort during regular traveling.

EXAMPLES

Tires were prepared in that, in the run flat tire, the tire size was 235/50R18, a single carcass layer was mounted between a pair of bead portions, the carcass layer was wound to the outer side from the tire inner side around the bead core of each bead portion, the bead filler was arranged on the outer peripheral side of each bead core in the bead portion, two belt layers were disposed on the outer peripheral side of the carcass layer in the tread portion, and a belt cover layer was disposed on the outer peripheral side of these belt layers, and a side reinforcing layer having a falcated cross-sectional shape was disposed between the carcass layer and the inner liner layer in the side wall portion, and the additional reinforcing layer was embedded more to the outer side than the carcass layer in a range of 15% to 70% of the tire cross-sectional height SH; and Comparative Examples 1 to 4 and Working Examples 1 to 8 were performed with the thickness $G_{min}$ of a minimum wall thickness portion, thickness $G_{max}$ of the maximum wall thickness portion, the length $L_{min}$ of the thin wall region, the relationship between the tire cross-sectional height SH and the length $L_{min}$ of the thin wall region, the relationship among the weight Wr of the side reinforcing layer, the total weight Wt of the tire and the tire flattening rate R (%), the thickness Ga on the rim check line position of the outer side rubber portion, the maximum thickness Gb in the side wall portion of the outer side rubber portion, the relationship between the thickness Ga and the maximum thickness Gb, the thickness Gc on the rim check line position of the inner side rubber portion, the relationship between the thickness Ga and the thickness Gc, the tan δ at 60° C. and the JIS-A hardness at 20° C. of each rubber composition configuring the side reinforcing layer, the bead filler and the additional reinforcing layer, the width W of the additional reinforcing layer, the maximum thickness Gd of the additional reinforcing layer, and the presence or absence of the use of a hybrid cord (existence or absence of a hybrid cover) in the belt cover layer, set as indicated in Table 1 and Table 2.

In Table 1 and Table 2, the tan δ of the side reinforcing layer is listed as "tan δ [RFL]", the JIS-A hardness of the side reinforcing layer is listed as "Hs [RFL]", the tan δ of the bead filler is listed as "tan δ [BFL]", the JIS-A hardness of the bead filler is listed as "Hs [BFL]", the tan δ of the additional reinforcing layer is listed as "tan δ [2FL]", and the JIS-A hardness of the additional reinforcing layer is listed as "Hs [2FL]". When each of the side reinforcing layers, bead fillers, and additional reinforcing layers were configured of an inner peripheral section and an outer peripheral section with the physical properties of these inner peripheral sections and outer peripheral sections made to be mutually different, the value of the inner peripheral section and the value of the outer peripheral section are indicated with a "/" therebetween.

Further, the hybrid cords used in the belt cover layers were a nylon fiber yarn and an aramid fiber yarn twisted together, and in those tires in which the hybrid cord was not applied, a nylon fiber cord was used in the belt cover layer.

The run flat durability, ride comfort, and weight were evaluated for these test tires according to the following evaluation methods, and the results thereof are shown in Tables 1 and 2.

Run Flat Durability:

Each test tire was assembled on a wheel with a rim size of 18×7.5 J, mounted on a test vehicle, and inflated to an air pressure of 230 kPa, except for the right side drive axle tire whose valve core was removed, and the vehicle was run on an asphalt road surface test course at an average speed of 80 km/h. Running was continued until a driver felt vibration caused by the breakdown of the tire and the running distance was measured. Such measurement was performed by three test drivers, and the average running distance was found. The evaluation results were expressed as indexes with the result of Conventional Example being assigned an index of 100. Larger index values indicate correspondingly superior run flat durability.

Riding Comfort:

Each test tire was assembled on the wheel with a rim size of 18×7.5 J, mounted on the test vehicle, and inflated to the air pressure of 230 kPa. The vehicle was run on the asphalt road surface test course at the average speed of 80 km/h, and a sensory evaluation was conducted by the driver. Such evaluation was performed by three test drivers, and the average evaluation values were found. The evaluation results were expressed as indexes with the result of Conventional Example assigned an index of 100. Larger index values indicate correspondingly superior ride comfort.

Weight:

The weight of each test tire was measured. The evaluation results were expressed as indexes taking the inverse of the measured values, with the Conventional Example being assigned an index of 100. Larger index values indicate correspondingly less tire weight.

TABLE 1

|  | Conventional Example | Comparative Example 1 | Comparative Example 2 | Comparative Example 3 | Comparative Example 4 | Working Example 1 | Working Example 2 |
|---|---|---|---|---|---|---|---|
| $G_{min}$ (mm) | 16 | 12.2 | 12.2 | 12.2 | 12.2 | 12.2 | 12.2 |
| $G_{max}$ (mm) | 17.8 | 17.8 | 17.8 | 17.8 | 17.8 | 17.8 | 17.8 |
| $G_{min}/G_{max}$ | 0.90 | 0.69 | 0.69 | 0.69 | 0.69 | 0.69 | 0.69 |
| $L_{min}$ (mm) | 5 | 5 | 25 | 25 | 25 | 25 | 25 |
| $L_{min}/SH$ | 0.043 | 0.043 | 0.216 | 0.216 | 0.216 | 0.216 | 0.216 |
| Wr/(Wtx(1 − 0.2 × (1 − R/50))) | 0.200 | 0.200 | 0.200 | 0.142 | 0.142 | 0.142 | 0.142 |
| Gb (mm) | 6.5 | 6.5 | 6.5 | 6.5 | 8.2 | 8.2 | 8.2 |
| Ga (mm) | 5.0 | 5.0 | 5.0 | 5.0 | 7.9 | 7.9 | 7.9 |
| Ga/Gb | 0.77 | 0.77 | 0.77 | 0.77 | 0.96 | 0.96 | 0.96 |
| Gc (mm) | 3.0 | 3.0 | 3.0 | 3.0 | 3.0 | 6.0 | 6.0 |
| Gc/Ga | 0.60 | 0.60 | 0.60 | 0.60 | 0.60 | 0.76 | 0.76 |
| Hs[RFL] | 70 | 70 | 70 | 70 | 70 | 70 | 70 |
| tanδ[RFL] | 0.03 | 0.03 | 0.03 | 0.03 | 0.03 | 0.03 | 0.03 |
| Hs[BFL] | 90 | 90 | 90 | 90 | 90 | 90 | 70 |
| tanδ[BFL] | 0.15 | 0.15 | 0.15 | 0.15 | 0.15 | 0.15 | 0.03 |
| Hs[2FL] | 90 | 90 | 90 | 90 | 90 | 90 | 90 |
| tanδ[2FL] | 0.15 | 0.15 | 0.15 | 0.15 | 0.15 | 0.15 | 0.15 |
| W (mm) | 20 | 20 | 20 | 20 | 20 | 20 | 20 |
| G (mm) | 1.5 | 1.5 | 1.5 | 1.5 | 1.5 | 1.5 | 1.5 |
| Hybrid Cover | Absent | Absent | Absent | Absent | Absent | Absent | Absent |

TABLE 1-continued

|  | Conventional Example | Comparative Example 1 | Comparative Example 2 | Comparative Example 3 | Comparative Example 4 | Working Example 1 | Working Example 2 |
|---|---|---|---|---|---|---|---|
| Yes/No |  |  |  |  |  |  |  |
| Run flat durability | 100 | 98 | 97 | 95 | 101 | 108 | 118 |
| Riding comfort | 100 | 103 | 105 | 108 | 107 | 108 | 113 |
| Weight | 100 | 100 | 100 | 117 | 117 | 117 | 117 |

TABLE 2

|  | Conventional Example | Working Example 3 | Working Example 4 | Working Example 5 | Working Example 6 | Working Example 7 | Working Example 8 |
|---|---|---|---|---|---|---|---|
| $G_{min}$ (mm) | 16 | 12.2 | 12.2 | 12.2 | 12.2 | 12.2 | 12.2 |
| $G_{max}$ (mm) | 17.8 | 17.8 | 17.8 | 17.8 | 17.8 | 17.8 | 17.8 |
| $G_{min}/G_{max}$ | 0.90 | 0.69 | 0.69 | 0.69 | 0.69 | 0.69 | 0.69 |
| $L_{min}$ (mm) | 5 | 25 | 25 | 25 | 25 | 25 | 25 |
| $L_{min}/SH$ | 0.043 | 0.216 | 0.216 | 0.216 | 0.216 | 0.216 | 0.216 |
| $Wr/(Wt \times (1 - 0.2 \times (1 - R/50)))$ | 0.200 | 0.142 | 0.142 | 0.142 | 0.142 | 0.142 | 0.142 |
| Gb (mm) | 6.5 | 8.2 | 8.2 | 8.2 | 8.2 | 8.2 | 8.2 |
| Ga (mm) | 5.0 | 7.9 | 7.9 | 7.9 | 7.9 | 7.9 | 7.9 |
| Ga/Gb | 0.77 | 0.96 | 0.96 | 0.96 | 0.96 | 0.96 | 0.96 |
| Gc (mm) | 3.0 | 6.0 | 6.0 | 6.0 | 6.0 | 6.0 | 6.0 |
| Gc/Ga | 0.60 | 0.76 | 0.76 | 0.76 | 0.76 | 0.76 | 0.76 |
| Hs[RFL] | 70 | 70 | 70 | 72/68 | 72/68 | 72/68 | 72/68 |
| tanδ[RFL] | 0.03 | 0.03 | 0.03 | 0.03 | 0.03 | 0.03 | 0.03 |
| Hs[BFL] | 90 | 70 | 70 | 70 | 72/68 | 72/68 | 72/68 |
| tanδ[BFL] | 0.15 | 0.03 | 0.03 | 0.03 | 0.03 | 0.03 | 0.03 |
| Hs[2FL] | 90 | 90 | 70 | 70 | 70 | 72/68 | 72/68 |
| tanδ[2FL] | 0.15 | 0.15 | 0.03 | 0.03 | 0.03 | 0.03 | 0.03 |
| W (mm) | 20 | 50 | 50 | 50 | 50 | 50 | 50 |
| G (mm) | 1.5 | 3.0 | 3.0 | 3.0 | 3.0 | 3.0 | 3.0 |
| Hybrid Cover Yes/No | Absent | Absent | Absent | Absent | Absent | Absent | Present |
| Run flat durability | 100 | 125 | 128 | 127 | 126 | 125 | 126 |
| Riding comfort | 100 | 115 | 117 | 120 | 122 | 124 | 125 |
| Weight | 100 | 117 | 117 | 117 | 117 | 117 | 117 |

As evident from Tables 1 and 2, the tires in Working Examples 1 to 8, in contrast to those of the Conventional Example and regardless of having a reduced weight, concurrently demonstrated a high degree of improvement in the durability during run flat traveling and the ride comfort during regular traveling. In contrast to this, the tires in Comparative Examples 1 to 4, although demonstrating lightweight characteristics and partial improvement results for the durability during run flat traveling and the ride comfort during regular traveling, such improvement results were not necessarily sufficient.

What is claimed is:

1. A run flat tire comprising:
    an annular tread portion extending in a tire circumferential direction;
    a pair of side wall portions arranged on both sides of the tread portion; and
    a pair of bead portions arranged on inner sides in a tire radial direction of the side wall portions;
    at least one carcass layer being mounted between the pair of bead portions, the carcass layer being wound from a tire inner side to a tire outer side around a bead core of each of the bead portions, a bead filler being arranged on an outer peripheral side of each bead core in each of the bead portions, a plurality of belt layers being arranged on an outer peripheral side of the carcass layer in the tread portion, a side reinforcing layer in a falcated cross-sectional shape being arranged between the carcass layer and an inner liner layer in the side wall portion; wherein
    a minimum wall thickness portion in a range from a center position of the tread portion to a tire maximum width position is arranged between an end portion of the belt layers and a position at 70% of a tire cross-sectional height SH, a relationship between a thickness $G_{min}$ of the minimum wall thickness portion and a thickness $G_{max}$ of the maximum wall thickness portion in the side wall portion is $0.5 \times G_{max} \leq G_{min} \leq 0.8 \times G_{max}$, and a relationship between a length $L_{min}$ on a tire outer surface in a tire meridian cross-section of a thin wall region where a wall thickness difference to the minimum wall thickness portion is 1 mm or less and the tire cross-sectional height SH is $0.18 \times SH \leq L_{min} \leq 0.26 \times SH$;
    a relationship among a weight Wr of the side reinforcing layer, a total weight Wt of the tire, and a tire flattening rate R (%) is $0.08 \times Wt \times (1-0.2 \times (1-R/50)) \leq Wr \leq 0.18 \times Wt \times (1-0.2 \times (1-R/50))$;
    a relationship between a thickness Ga on a rim check line position of an outer side rubber portion positioned more to the outer side than the carcass layer and a maximum thickness Gb in the side wall portion of the outer side rubber portion is $0.8 \times Gb \leq Ga \leq 1.0 \times Gb$; and a relationship between a thickness Gc on a rim check line position of an inner side rubber portion positioned more to the inner side than the carcass layer and the thickness Ga on the rim check line position of the outer side rubber portion is $0.7 \times Ga \leq Gc \leq 1.0 \times Ga$.

2. The run flat tire according to claim 1, wherein a tan δ of a rubber composition composing the side reinforcing layer is from 0.01 to 0.08 at 60° C., and a JIS-A hardness of the rubber composition composing the side reinforcing layer is from 68 to 80 at 20° C.

3. The run flat tire according to claim 2, wherein a tan δ of a rubber composition composing the bead filler is from 0.03 to 0.08 at 60° C., and a JIS-A hardness of the rubber composition composing the bead filler is from 68 to 74 at 20° C.

4. The run flat tire according to claim 3, wherein an additional reinforcing layer is embedded more to the outer side than the carcass layer within a range of 15% to 70% of the tire cross sectional height SH, a width of the additional reinforcing layer is at least 35% of the tire cross sectional height SH, and a maximum thickness Gd of the additional reinforcing layer is from 2 mm to 7 mm.

5. The run flat tire according to claim 4, wherein a tan δ of a rubber composition composing the additional reinforcing layer is from 0.01 to 0.08 at 60° C., and a JIS-A hardness of the rubber composition composing the additional reinforcing layer is from 68 to 80 at 20° C.

6. The run flat tire according to claim 5, wherein the side reinforcing layer is configured of an inner peripheral section and an outer peripheral section that overlap in the tire radial direction, and a JIS-A hardness of a rubber composition composing the outer peripheral section at 20° C. is less than a JIS-A hardness of a rubber composition composing the inner peripheral section at 20° C.

7. The run flat tire according to claim 6, wherein the bead filler is configured of an inner peripheral section and an outer peripheral section that overlap in the tire radial direction, and a JIS-A hardness of a rubber composition composing the outer peripheral section at 20° C. is less than a JIS-A hardness of a rubber composition composing the inner peripheral section at 20° C.

8. The run flat tire according to claim 7, wherein the additional reinforcing layer is configured of an inner peripheral section and an outer peripheral section that overlap in the tire radial direction, and a JIS-A hardness of a rubber composition composing the outer peripheral section at 20° C. is less than a JIS-A hardness of a rubber composition composing the inner peripheral section at 20° C.

9. The run flat tire according to claim 8, wherein a belt cover layer is arranged on an outer peripheral side of the belt layers, and the belt cover layer is configured of a composite fiber cord in which a low elasticity yarn and a high elasticity yarn having a mutually different elastic modulus are twisted together.

10. The run flat tire according to claim 1, wherein an additional reinforcing layer is embedded more to the outer side than the carcass layer within a range of 15% to 70% of the tire cross sectional height SH, a width of the additional reinforcing layer is at least 35% of the tire cross sectional height SH, and a maximum thickness Gd of the additional reinforcing layer is from 2 mm to 7 mm.

11. The run flat tire according to claim 10, wherein a tan δ of a rubber composition composing the additional reinforcing layer is from 0.01 to 0.08 at 60° C., and a JIS-A hardness of the rubber composition composing the additional reinforcing layer is from 68 to 80 at 20° C.

12. The run flat tire according to claim 1, wherein the side reinforcing layer is configured of an inner peripheral section and an outer peripheral section that overlap in the tire radial direction, and a JIS-A hardness of a rubber composition composing the outer peripheral section at 20° C. is less than a JIS-A hardness of a rubber composition composing the inner peripheral section at 20° C.

13. The run flat tire according to claim 1, wherein the bead filler is configured of an inner peripheral section and an outer peripheral section that overlap in the tire radial direction, and a JIS-A hardness of a rubber composition composing the outer peripheral section at 20° C. is less than a JIS-A hardness of a rubber composition composing the inner peripheral section at 20° C.

14. The run flat tire according to claim 10, wherein the additional reinforcing layer is configured of an inner peripheral section and an outer peripheral section that overlap in the tire radial direction, and a JIS-A hardness of a rubber composition composing the outer peripheral section at 20° C. is less than a JIS-A hardness of a rubber composition composing the inner peripheral section at 20° C.

15. The run flat tire according to claim 1, wherein a belt cover layer is arranged on an outer peripheral side of the belt layers, and the belt cover layer is configured of a composite fiber cord in which a low elasticity yarn and a high elasticity yarn having a mutually different elastic modulus are twisted together.

\* \* \* \* \*